Patented July 1, 1930

1,769,405

UNITED STATES PATENT OFFICE

FREDERICK LOUIS WILDER, EDWARD MORRIS, EDMUND SCHIFF, AND EDWIN SEPTIMUS KING, OF LONDON, ENGLAND, ASSIGNORS TO ELECTRO-METALLURGICAL ORE REDUCTION, LIMITED, OF LONDON, ENGLAND

ROASTING OF ORES AND THE LIKE

No Drawing. Application filed March 29, 1928, Serial No. 265,782, and in Great Britain April 6, 1927.

This invention relates to the preparation for roasting treatment, of ores and the like and metallurgical products for example the oxidation of pyritic and sulphide ores, natural sulphides, arsenides, imperfectly roasted residues, regulus, mattes, hardheads and generally products containing compounds of tin and/or other metals such as lead, zinc, copper, bismuth, antimony, tungsten, iron and associated base and precious metals.

In the roasting of such materials for oxidation as of tin, iron and other metals and expulsion of volatile compounds of sulphur, arsenic and so on, if such roasting is to be conducted efficiently at low temperatures, the material should be in a fine condition and steps taken to prevent or minimize any carrying off of solid particles in the current of gases used in the oxidation. Further, any formation of fusion products as by fusion or sintering say of sulphides and arcenides is to be avoided as otherwise complex bodies are formed which take up elements that should either be expelled as volatiles or be left in the roast as oxides and which bodies may involve separation difficulties. In the case say of tin ores, concentrates or the like the final product of the roasting should contain all the original tin as oxide and iron compounds and others as of tungsten, copper and the like which are not expelled in the roasting should be readily separable from the tin oxide, for instance, the tungsten compounds separable by the action of suitable solvents on the roasted product and the iron as oxide by flotation or other simple means.

With the object of overcoming such disadvantages and fulfilling such requirements as are set forth above, the invention consists generally in dispersing the starting material, ores or the like in a substantial quantity of suitable clay medium, making the whole into a plastic mass by addition of sulphate solution and then shaping the mass into small size forms presenting a high area to mass ratio and of such a shape as to inhibit any close packing of the forms together and then drying these forms whereupon the roasting thereof may be conducted in a muffle, retort or the like.

In carrying the invention into effect in one convenient form as applied to the roasting of tin-bearing materials, five parts by volume of a tin concentrate (containing about 15 per cent recoverable sulphur), 95 per cent of which is in such a state of subdivision as to pass through a sieve of about 200 mesh, is thoroughly mixed in a dry state with about one volume of good refined brick clay or china clay, preferably as free as possible from silicious matter, lime and iron hydrate, and the whole made plastic by addition of a 10 per cent solution of iron sulphate. The quantity of iron sulphate used is such that the dried product contains ferrous sulphate amounting to 2.5 per cent by weight.

The plastic mass, such as the above, is then pressed, stamped or otherwise shaped (without such processes as have been contemplated in making briquettes for smelting) into small forms of a ring shape or any other shape presenting a high ratio of superficial area to mass and inhibiting packing of the forms closely together.

A particularly suitable and effective shape for the forms is that of a ring of a hexagonal section and having axially projecting portions of frusto-conical shape on one or both sides. The ratio above referred to is, in such a form, very high and the projecting portions prevent the undesirable packing referred to, the circulation of air or other gases or vapours being greatly facilitated.

The forms after being conveniently dried are then ready for subjection to the roasting operation, which may be conducted in a vertical muffle or retort. With the ore or like material in the dispersed condition, it appears that during the first part of the heating before the hottest zone in the muffle is reached the $SO_3$ given off inside the forms by the ferrous sulphate and the presence of vapour of dehydration of the clay results in the iron compounds, e. g. sulphides in the forms, becoming converted in situ into sulphates which, as the forms pass down the retort into the hotter zone, are in turn decomposed into oxide of iron and $SO_3$, the latter being evolved from the forms and passing up the retort where in the cooler zone it encounters fresh forms, similar reactions again taking place.

In the case of an ore containing less than about 20 per cent of pyrites, yellow pyrites would require to be added to bring the content up to about 30 per cent to obtain the best effects for example to make ore self-burning as known. Where, owing to a deficiency of sulphur in the ore or the like, pyrites has to be added, this is preferably effected during the dry or substantially dry mixing with the clay or like binder and before the iron sulphate is added to make a plastic mass.

In roasting the materials prepared in accordance with the present invention, besides sulphur which comes off as above, arsenic compounds and like volatiles pass off with ease. The decomposition of the iron compounds and the recompounding of the iron as oxide leaves it in a different physical state, which may be described as flocculent. Other non-volatile oxides besides the iron oxide are also formed in a flocculent condition. Any tungsten compounds originally present, for example in association with tin, copper, manganese or the like, are largely decomposed and the tungsten is left in the forms in a compounded condition amenable to leaching treatment.

The roasted product from the furnace, i. e. the roasted forms, are of a highly porous or spongy nature and friable, thus facilitating such subsequent leaching, flotation or like operations as may subsequently be effected. In the case of pyritic gold ore substantially complete oxidation has been effected at the very low temperature of some 350° C. and generally the temperatures required for similar results when dealing with other materials are correspondingly low.

While the forms into which the plastic product is shaped are preferably small rings as described above, it is to be understood that other shapes may also be employed so long as they conform with the stipulations above made with regard to avoidance of packing and to the ratio of superficial area to mass. For instance the material may be formed as a very thin sheet having corrugations or projecting lugs being broken or cut up, before or after drying, to any desired size. Minor modifications may also be made to the proportions of binder and/or iron sulphate and/or added pyrites according to the nature of the ore or the like being treated.

We claim:

1. In the preparation of mineral materials for an oxidizing roast and separation of volatile constituents from non-volatile constituents, the method whereby non-volatile constituents may be obtained in readily separable oxidized condition and free from fusion products, which comprises dispersing the said materials in a fine state of subdivision in a substantial volume of clay, bringing the whole to plastic condition, shaping the plastic product into forms of anti-packing configuration and high area to mass ratio and drying said forms.

2. In the preparation of mineral materials for an oxidizing roast and separation of volatile constituents from non-volatile constituents, the method whereby non-volatile constituents may be obtained in readily separable oxidized condition and free from fusion products, which comprises dispersing the said materials in a fine state of subdivision in a substantial volume of clay, adding sufficient pyrites to ensure a content of substantially 30 per cent, thereof in the mass, bringing the whole to plastic condition by adding iron sulphate solution, shaping the plastic product into forms of anti-packing ring-like configuration and high area to mass ratio and drying said forms.

3. In the process according to claim 1, shaping the plastic product into small size forms of ring-like configuration having projecting portions to inhibit packing and drying said forms.

4. In the process according to claim 1, effecting the incorporation of the clay with the mineral material in dry condition and subsequently obtaining a plastic mass by adding to the dry mixture sulphate solution.

5. In the preparation for roasting of tin-bearing materials containing inter alia iron and sulphur compounds, the method which comprises mixing substantially five volumes of said materials in fine and dry condition with substantially one volume of refined clay, incorporating with the mixture sufficient iron sulphate solution of substantially 10 per cent. strength to produce a plastic mass of the whole and to leave on drying some 2.5 per cent. by weight ferrous sulphate, shaping said plastic mass into small forms of anti-packing configuration and of high surfaces to mass ratio and subjecting said forms to drying.

In testimony whereof we have signed our names to this specification.

FREDERICK LOUIS WILDER.
EDWARD MORRIS.
EDMUND SCHIFF.
EDWIN SEPTIMUS KING.